June 18, 1957  A. A. MOLITOR  2,795,973
INDEXING DEVICE
Filed March 24, 1952  7 Sheets-Sheet 1

INVENTOR.
ARVID A. MOLITOR

June 18, 1957     A. A. MOLITOR     2,795,973
INDEXING DEVICE

Filed March 24, 1952     7 Sheets-Sheet 2

*INVENTOR.*
ARVID A. MOLITOR
BY

June 18, 1957     A. A. MOLITOR     2,795,973
INDEXING DEVICE

Filed March 24, 1952             7 Sheets-Sheet 3

INVENTOR.
ARVID A. MOLITOR
BY Roger C. Johnson
Atty

June 18, 1957 A. A. MOLITOR 2,795,973
INDEXING DEVICE
Filed March 24, 1952
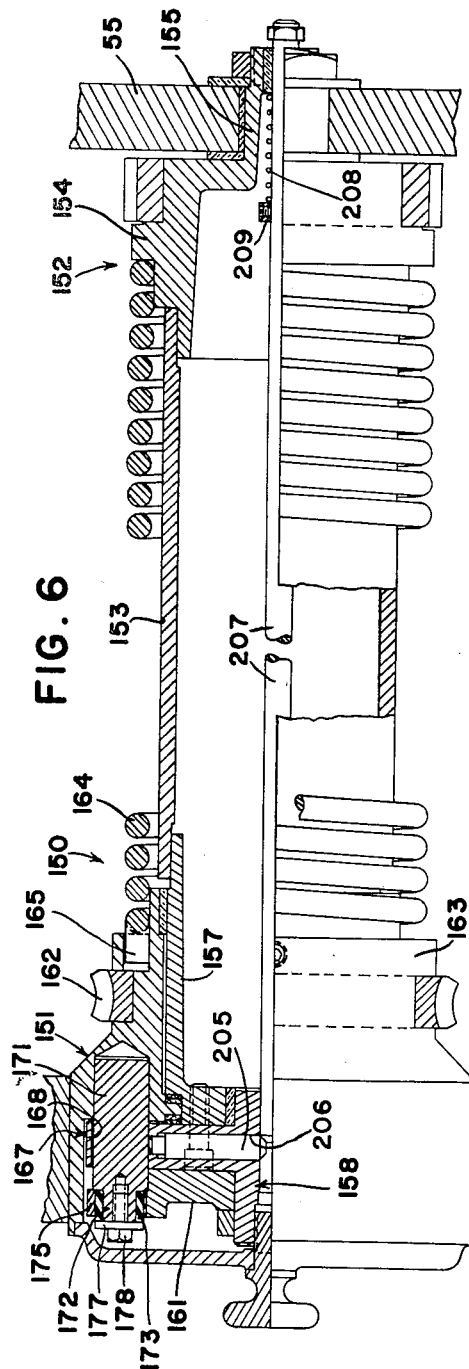
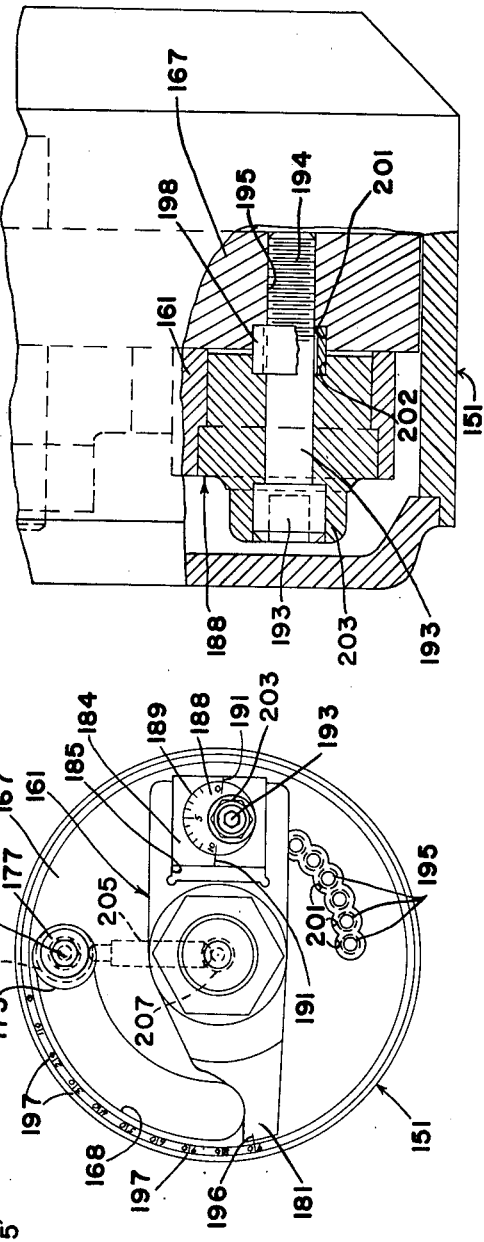
INVENTOR.
ARVID A. MOLITOR June 18, 1957     A. A. MOLITOR     2,795,973
INDEXING DEVICE
Filed March 24, 1952     7 Sheets-Sheet 5
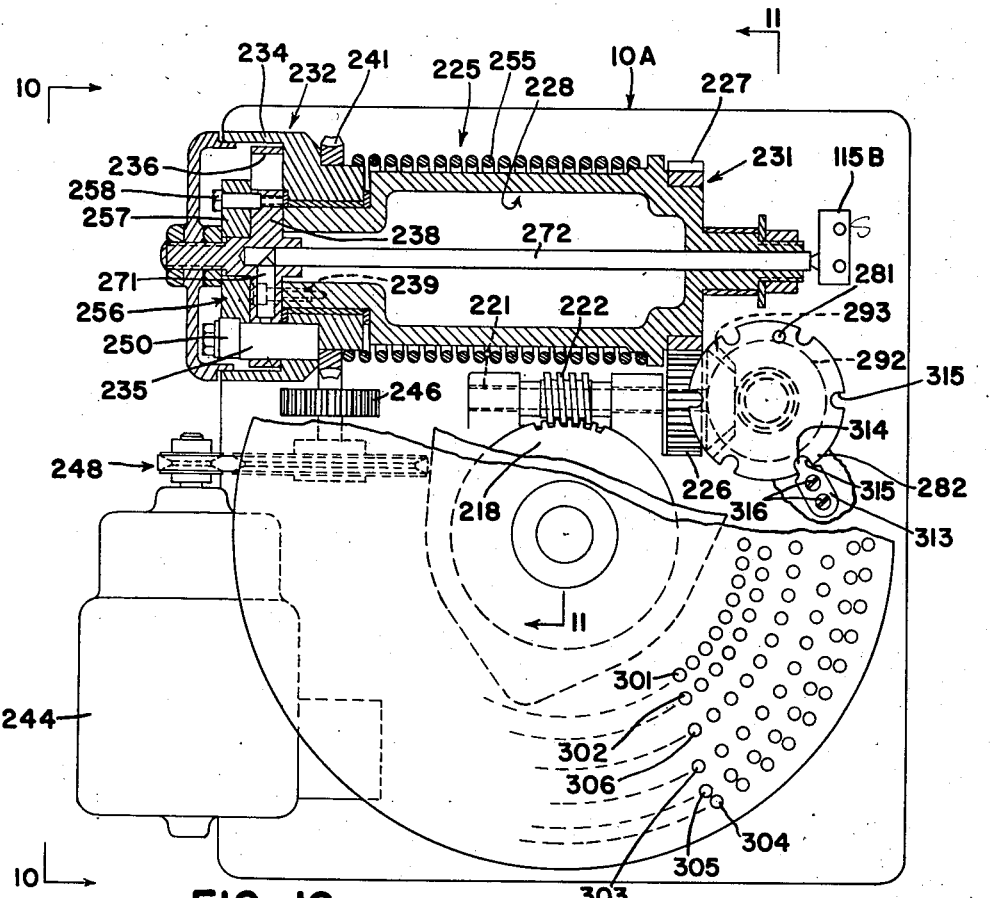
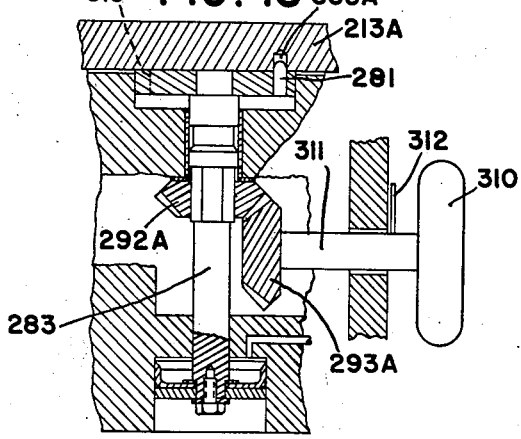
INVENTOR.
ARVID A. MOLITOR June 18, 1957     A. A. MOLITOR     2,795,973
INDEXING DEVICE Filed March 24, 1952     7 Sheets-Sheet 6

INVENTOR.
ARVID A. MOLITOR
BY

June 18, 1957

A. A. MOLITOR 2,795,973

INDEXING DEVICE

Filed March 24, 1952

INVENTOR.
ARVID A. MOLITOR
BY Roger C. Johnson
Atty

United States Patent Office 2,795,973
Patented June 18, 1957

2,795,973

INDEXING DEVICE

Arvid Axel Molitor, Whitewater, Wis.

Application March 24, 1952, Serial No. 278,227

47 Claims. (Cl. 74—822)

This invention relates generally to machine tools and the like, and more particularly to automatic indexing devices for work-carrying supports, such as rotatable or linearly movable tables or the like upon which work pieces are adapted to be supported to be operated on by associated tools or other means.

The object and general nature of this invention is the provision of an indexing mechanism employing stored energy for shifting a work-carrying support or work carrier from one position to another, with means for restoring the energy, expended during the carrier shifting operation, during the operating cycle of the tool or other means operating or the work piece or pieces on the work carrier.

More specifically, it is an important feature of this invention to provide an indexing mechanism having a unit capable of receiving and storing energy, such as that derived from a motor actuated over a relatively long period of time, and then capable of practically instantaneously exerting a relatively large force, such as to shift a work carrier, which may have considerable mass, from one position to another. Thus, as applied to a machine tool, the present invention contemplates the provision of a device capable of exerting a large force so as to shift a relatively heavy work carrier, with a relatively heavy work piece thereon, in a very short period of time, after a tool or the like has operated on the work piece, and then, during the time when the tool is operating on the work piece through another cycle, to have the energy, expended by shifting the carrier and work piece, restored by a relatively small power source operating over a relatively long period of time. In other words, the carrier shifting phase of an automatic machine tool operation represents unproductive time, and it therefore is the principal object of this invention to provide means utilizing a relatively small power source operating over a relatively long period of time, as during the time the tool is caused to operate on the work piece, to build up a source of energy which, when the carrier and work piece is to be shifted to provide for the next operating cycle, can be used to shift the carrier and work piece in the shortest period of time possible, thereby reducing to a minimum the unproductive time of the machine. Additionally, the present invention makes it possible to materially increase the productive capacity of the machine.

By way of example, the unit adapted to store energy may be in the form of a relatively heavy spring which, when tensioned or biased, is in a condition to release its stored energy substantially instantaneously but which may be rewound by a relatively small motor or other power source acting, as through a reduction gearing, over a relatively long period or time. In this way, a relatively heavy work carrier carrying a relatively heavy work piece may be advanced from one position or station to the next with much greater rapidity than would be possible if the relatively small motor were directly connected to the carrier and required to accelerate and shift the heavy carrier and work piece from a standstill so as to move them into their next position or station.

A further feature of this invention is the provision of means including a stored energy unit for shifting a work carrier, with motion limiting means having substantially an infinite number of available adjustments for determining the extent of movement imparted to the work carrier each time the stored energy is released. Further, it is a feature of this invention to correlate such a stored energy unit and adjustable motion transmitting means with a work carrier having locking means constructed and arranged to positively hold the carrier successively in different preselected positions, whereby a wide range of preselection of work carrier positions is available.

More specifically, it is a feature of this invention to provide an adjustable work carrier shifting means operating in connection with a progressively shiftable locking means whereby, when necessary, the work carrier may be shifted in very small increments of movement, and by adjusting said shifting means and/or said locking means the work carrier may be shifted successively through distances corresponding to any multiple of said increment.

These and other objects and advantages of the present invention will be apparent to those skilled in the art after a consideration of the following detailed description of the preferred means in which the principles of the present invention have been incorporated, taken in conjunction with the accompanying drawings, in which:

Figures 6, 7 and 8 show a modified form of the present invention.

Figure 9 is a view similar to Figure 1 showing another form of the present invention.

Figure 11:
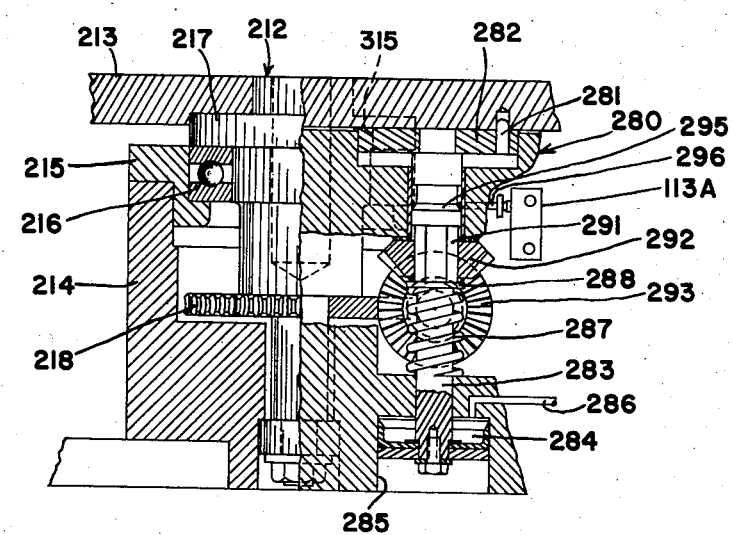
Figure 11 is a fragmentary sectional view, taken generally along the line 11—11 of Figure 9.

Figures 12–17, inclusive, are fragmentary partly diagrammatic views, illustrating the action of the shiftable index plunger shown in Figures 9 and 11.

Figure 18 is a fragmentary sectional view similar to Figure 11, showing another modification of the present invention.

Referring first to Figures 1–4, the present invention has been shown as incorporated in an indexing mechanism for a work carrier of the rotatable table type. As shown, a casing 10 of any suitable construction carries bearing means, including a lower bearing 11 in which a work table spindle 12 is journaled for rotation. The upper portion of the spindle 12 has a table 13 fixed thereto, preferably to an upper head section 14 of the spindle 12. The table 13 rotates within a guide ring 15 that is fixed to the upper part of the casing 10. On the underside of the table the latter is provided with a series of spaced apart peripherally arranged plunger-receiving openings 16, in each of which is a hardened steel bushing or liner 17. The table 13 may have as many openings 16 as may be desired, limited only by the requirements of space and the number of table positions or stations desired. In the form of the invention shown provision is made for forty openings 16.

For purposes of illustration, I have shown the table 13 as carrying a chuck 21 in which a rosette blank 22 is fixed. The workpiece or blank 22 is adapted to be operated on by a cutting tool 23 driven by any suitable means and supported for movement radially of the blank 22 by a reciprocatory unit 24, conventional so far as the present invention is concerned. Usually, the unit 24 forms a part of the machine of which the unit 24 is the work performing means and on which the indexing means of the present invention is supported. The cutting tool 23 forms a groove in the blank 22 at each pass of the unit 24, and where the table 13 is provided with forty openings 16 to receive locking means adapted successively to enter an opening 16, forty grooves are formed in the blank to complete the same.

Figure 3:
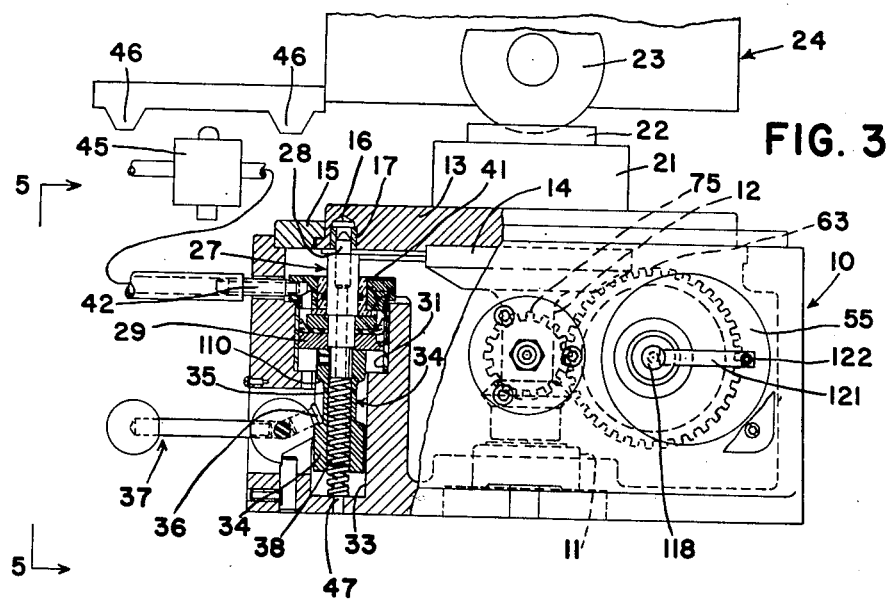
Figure 3 is a view, partially in elevation and partially in section, taken generally along the line 3—3 of Figure 1.
Figure 4:
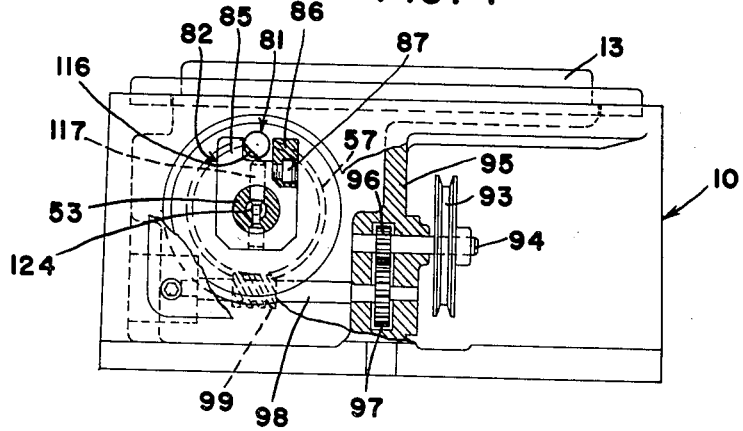
Figure 4 is an elevational view, with the rewinding motor omitted and certain portions shown in section, taken generally along the line 4—4 of Figure 1.

The rotatable table 13 is held in each of its forty successive positions by a locking plunger 27 having an upper reduced end 28 adapted to fit snugly in the bushing 17. The lower portion of the plunger 27 carries a piston 29 movable in a cylinder 31 formed in the casing 10, as best shown in Figure 3. Below the cylinder 31 the casing 10 is formed with a lower cylindrical bore 33 in which a hollow sleeve is vertically shiftable. The upper end of the hollow sleeve, which is indicated at 34, is fixed in any suitable manner to the lower end of the plunger 27. Intermediate its ends the cylindrical sleeve 34 is formed with an annular groove 35 that is arranged to receive the inner end 36 of a manually operable lever 37. By raising up on the outer end of the latter the plunger 27 will be pulled downwardly, against the tension in a spring 38 disposed between the lower end of the plunger 27 and the bottom of the cylindrical bore 33, and the upper plunger end 28 will be withdrawn from the bushing 17 in the table opening 16. When this occurs, the table 13 is free to rotate. The upper end of the cylinder 31 is closed by suitable packing gland means 41 and an air inlet tube 42 leads into the cylinder 31 above the piston 29, wherby air under pressure may be admitted into the cylinder 31 to withdraw the plunger from its table-locking position by automatically operated power means, if desired. For example, an air valve 45, interposed in a line leading from the inlet tube 42 and a source of compressed air, may be actuated at each pass of the machine tool operating head or unit 24, as by a cam or cams 46 carried by or movable with the unit 24.

The lower end of the spring 38 is centered by a dowel pin 47.

Figure 1:
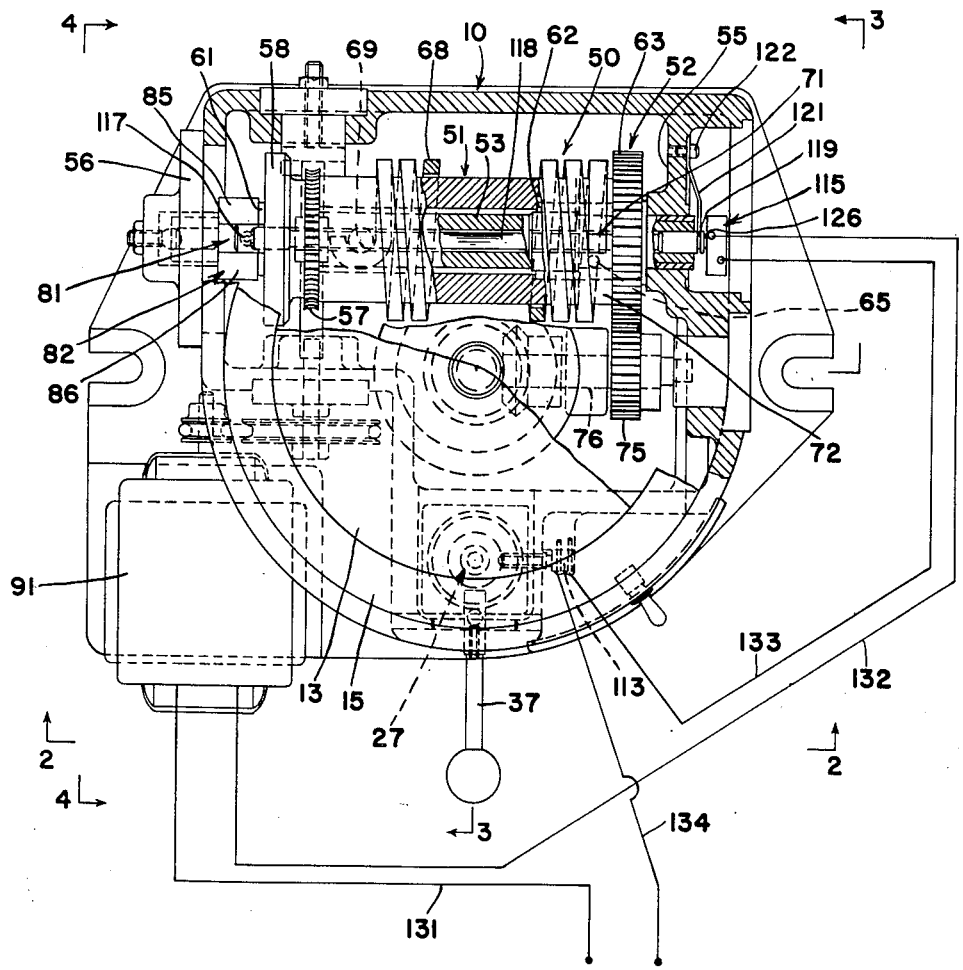
Figure 1 is a plan view of one form of indexing mechanism in which the principles of the present invention have been embodied.
Figure 2:
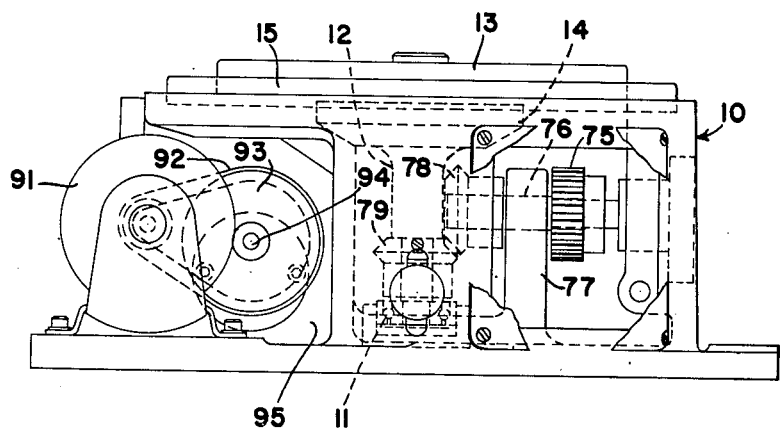
Figure 2 is a side elevation, taken generally along the line 2—2 of Figure 1.

After a withdrawal of the plunger 27 from the table 13, the latter is shifted to the next position or station by means that, according to the principles of the present invention, includes a stored energy unit 50. As best shown in Figure 1, the unit 50 is disposed within the casing 10, generally at the side opposite the plunger 27 and associated parts, and comprises a pair of coaxially spaced apart members 51 and 52 mounted on a shaft 53 rotatably mounted in the casing 10. One end of the shaft 53 is journaled in suitable bearing means carried by a wall 55 of the casing 10 and the other end of the shaft 53 is supported by suitable bearing means carried by a detachable bearing plate 56 fixed to the other side of the casing 10. At one end the member 51 has a worm gear 57 and an end member 58 fixed thereto by stud bolts or other suitable means. The end member is supported by bushing means 61 on the adjacent end of the shaft 53. The other end of the sleeve member 51 is carried by a bushing 62 on the shaft 53.

The other member 52 comprises a spur gear 63 having a hub that is apertured to receive a pin 65 by which the member 52 is fixed to the shaft 53. A relatively heavy spring 68 is fixed at one end by a pin 69 to the end of the sleeve member 51 adjacent the worm gear 57. The other end of the spring 68 has an inturned end 71 extending into an aperture or recess in a ring 72 fixed by axially extending bolts to the spur gear 63. The spur gear 63 meshes with a second spur gear 75 that is fixed to a shaft 76 supported in a pedestal 77 extending upwardly from the bottom of the housing 10. A bevel gear 78 on the inner end of the shaft 76 meshes with a bevel gear 79 that is fixed to the lower end of the table spindle 12. Thus, rotation of the member 52 acts through the motion transmitting gears 63, 75, 78, and 79 to rotate the table 13.

The relative motion permitted between the members 51 and 52 is limited by two cooperating parts 81 and 82 that are connected in fixed relation with the members 51 and 52, respectively. The part 81 comprises a pin fixed to the end member 58 and extending axially outwardly into a position between two laterally spaced apart sections 85 and 86 that form the principal portions of the part 82 and by virtue of which the part 82 serves as an abutment member carried by the member 52.

The diameter of the pin 81 is less than the distance between the adjacent faces of the sections 85 and 86 by a predetermined amount. Preferably, but not necessarily, the section 86 comprises a separate piece fixed by a stud bolt 87 to the other section 85. It should be noted at this point that the relative movement between the members 51 and 52 permitted by the pin 81 and abutment member 82 is exactly that which the member 52, acting through the aforesaid gearing 63, 75, 78 and 79, requires to produce a movement of the table 13 sufficient to advance the latter, when the plunger 27 is withdrawn, a distance equal to the distance between the adjacent openings 16, which is 1/40 of a revolution in the illustrative arrangement shown.

A relatively small motor 91 is mounted on the base of the housing 10 and is connected by a V-belt 92 to a pulley 93 fixed to a shaft 94 that is supported for rotation in a wall 95 of the housing or casing 10. The shaft 94 is connected by a pair of gears 96 and 97 with a shaft 98 carrying a worm 99 that meshes with the worm gear 57.

The worm 99 and worm gear 57 constitutes, with the gears 96, 97 and other associated parts, not only a gear reduction drive between the motor 91 and the member 51 but also an irreversible connection whereby, when the motor 91 and shaft 98 are stationary, the gear 57 is held against rotation and can therefore serve as an anchoring member for the spring 68. The parts are so arranged and assembled that the spring 68 is under tension or biased so as to tend to rotate the member 52 and thus advance the table. Normally, however, the table 13 is held against rotation by the plunger 27. When the plunger is withdrawn the energy stored in the spring 68 is substantially instantly available to rotate the gear 63 and advance the table. The amount of rotation that can be imparted to the gear 63 and table 13 is determined by the amount of lost motion between the pin 81 and the abutment member 82. That is to say, withdrawing the plunger 27 and releasing the table for rotation permits the spring 68 to rotate the gear 63, and the shaft 53 to which it is fixed by the pin 65, only until the abutment section 86 engages the right side (Figure 4) of the pin 81. As mentioned above, however, this is sufficient to rotate the table 13 the amount necessary to bring the next opening 16 substantially over the plunger 27 whereby the latter may be raised into locking relation with the table and thereby hold the work piece 22 in position to be operated on by the tool 23 at the next pass of the unit 24.

With the table held in position, the motor 91 may now be energized so as to wind the spring 68 by advancing the worm gear 57 and carrying the stop pin 81 away from the abutment 86 and back against the abutment 85. This rewinding takes place at the time that the tool 23 is operating on the blank 22, which ordinarily takes an appreciable length of time, and therefore only a small motor, such as is shown at 91, is necessary since the motor can operate during the relatively long length of time available and through a reduction gearing to rewind or restress the relatively heavy spring 68.

The present invention further contemplates new and improved control means whereby the rewinding of the spring 68 and the correlated starting and stopping of the motor 91 are automatically accomplished and, in general, respond to a withdrawal of the locking plunger 27, the latter being, as described above, automatically controlled by the reciprocation of the tool unit 24. Such control means will now be described.

Figure 5:
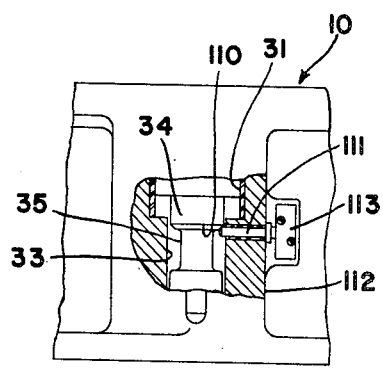
Figure 5 is a fragmentary elevational view taken generally along the line 5—5 of Figure 3, certain parts being broken away.

As best shown in Fig. 5, a shoulder 110 is formed on the sleeve 34 and is tapered so that when the sleeve is moved downwardly, either by the hand lever 37 or by air being directed into the plunger cylinder 31, a pin 111 carried in the portion 112 of the casing 10 is moved outwardly and actuates a switch unit 113 moving it from the normally closed position into an open circuit position. When the plunger 27 is in its carrier-locking position the sleeve 34 is raised and the switch moves into its closed position, and when the plunger 27 is lowered the switch 113 is moved into its open position.

A second switch unit 115 is carried by the casing 10 and is operated by movement of the stop pin 81 relative to the abutment 82. To this end one side of the stop pin 81 is slabbed off to provide an angled switch-operating face 116. The main portion of the abutment member 82 is formed with a radial bore in which a pin 117 having tapered ends is movable. The shaft 53 is hollow and slidably receives an elongated rod 118 which extends outwardly at one end and is grooved, as at 119, to receive a spring 121 that is fixed by a screw 122 or other suitable means to the outer face of the wall 55 of the casing 10. The spring 121 acts against the groove portion 119 to yieldingly maintain the other end 124, which is tapered, against the pin 117. The end of the rod 118 carrying the groove 119 engages the plunger 126 of the switch unit 115. The latter is normally open but is moved to a circuit closing position whenever the member 52 and its interconnected abutment member 82 is moved, as by downward movement of the plunger 27 releasing the table 13. The spring 68 then acts to turn the gear 63, together with the shaft 53 and abutment member 82, and the movement of the latter causes the abutment section 86 to approach and engage the stop pin 81, which terminates movement of the shaft 53 and gear 63, thus stopping the table. The pin 117 is carried with the member 82 and when the abutment section 86 reaches the pin 81, the pin 117 is free to move outwardly along angled surface 116. This permits the spring 121 to move the rod 118 away from the plunger of the switch unit 115, permitting the latter to move into its closed position.

As best shown in Figure 1, the motor 91 has a connector 131 leading from one terminal of the motor to one side of the power line. A second connector 132 leads from the other terminal of the motor to the switch unit 115. A third conductor 133 leads from the switch unit 115 to the other switch unit 113, and a fourth conductor 134 leads from the switch unit 113 to the other side of the power supply. The two switches 113 and 115 are in series with the motor 91.

Let it be assumed that the blank 22 is fixed in position on the chuck 21 and that the cutting tool 23 has completed one pass, forming a groove in the blank. The operation of the indexing device of the present invention is as follows.

As the head or unit 24 completes its pass, one of the cams 46 momentarily actuates the air valve 45. This permits air under pressure to be forced into the upper end of the cylinder, which moves the piston 29 downwardly and thus withdraws the plunger 27 from the opening 16 in the table 13. The initial downward movement of the plunger 27 acts through the pin 111 to move the switch 113 into its open circuit position, even before the upper end of the plunger stem 28 is completely withdrawn from the associated opening 16 in the plate 13. However, as soon as the pin 28 is withdrawn from the opening 16 the spring 68 being under torsion acts immediately to rotate the gear 63 and advance the table 13. As the gear 63 is thus rotated the abutment member 82 moves with it until the abutment section 86 comes up against the stop pin 81. This terminates further movement of the gear 63 and the table 13 therefore stops. The clearance or space between the pin 81 and the abutment sections 85 and 86, and the drive ratio provided by the gears 63, 75, 78 and 79, are so arranged that the table 13 is advanced 1/40 of a revolution each time the stored energy unit 50 operates. At the same time that the abutment 86 moves up against the stop pin 81, the pin 117 is forced radially outwardly by the spring 121 and rod 118, which permits the switch 115 to move into its closed circuit position. However, the motor 91 is not started or energized from the power supply until the spring 38 moves the plunger 27 upwardly into the next table opening 16 lying directly above the plunger, the latter being moved into a table-locking position by the spring 38 after the air in the cylinder 31 above the piston 29 has been released. Thus, the motor 91 is started up by the closing of both switch units 113 and 115 and acts through the worm 99 and worm gear 57 to advance the member 51. The advance of the latter member moves the stop pin 81 away from the abutment section 86, and substantially at the time that the pin 81 reaches the other abutment section 85 the angled face 116 on the stop 81 forces the pin 117 inwardly which moves the rod 118 toward the right, as viewed in Figure 1, against the action of the spring 121, thus shifting the switch unit 115 into its open circuit position and stopping the motor 91. Since the gearing 57, 99 is irreversible, stopping the motor 91 serves to lock or hold the member 51 against any further movement under the bias of the now rewound spring 68. The energy restored to the spring 68 is now substantially instantly available to rotate the gear 63 and advance the indexing table to its next position just as soon as the plunger 27 is again withdrawn from the table 13.

In the form of the invention described above the permissive relative movement between the members 51 and 52 is determined by the gear ratios and the clearance between the relatively fixed parts 81 and 82. This type of apparatus is particularly adapted for use in high production jobs where no change in the number of positions of the indexing table would be required over a relatively long period of time. If the indexing device of the present invention is to be used for a variety of indexing operations it would be desirable to provide some means for readily changing the amount the table advances for each operation of the stored energy unit. One way in which this could be done would be to change the gear ratios, as by replacing the gears 52 and 75 with gears of other diameters. For example, while still using the table 13 with forty holes therein, the gearing 52 and 75 might be changed so as to advance the table, for example, 1/20 of a revolution or by incorporating a higher ratio the table may be made to advance 1/10, 1/5, 1/4 or 1/2 a revolution, or more. If other increments of table advance are desired, a table having a set of openings other than 40 in number may be provided.

Instead of, or in addition to, changing the gear ratios to effect adjustment in the amount of table advance, the abutment section 86 may be replaced by other sections having different dimensions or clearance between the pin 81 or its equivalent and the abutment 82 or its equivalent. However, to adjust the permissive movement between the members 51 and 52 of the stored energy unit even more easily and quickly than by changing the abutment section 86 and/or associated gear or gears, for example, I provide the modified form of stored energy unit and associated motion limiting mechanism shown in Figures 6–8.

Referring now to Figures 6–8, the modified form of stored energy unit is shown at 150 and comprises two relatively rotatable members 151 and 152. The member 152 includes a sleeve 153 fixed at one end to a head 154 that includes a hub 155 journaled in the wall 55 of the casing 10. At the other end the sleeve 153 is fixed to a cylindrical section 157 secured to the hub of a head 158 that forms a part of the member 152. A stop lever 161 is fixed to the head 158 so as to rotate with the member 152.

The member 151 carries a worm gear 162 that is adapted to be driven by the worm 99. Adjacent the gear 162 is a spring holder ring 163 to which one end 165 of a spring 164 is fixed, the other end of the spring 164 being fixed in any suitable way to the head 154. The member 158 includes a disk member 167 in which an arcuate slot 168 is formed. The slot 168 extends approximately 90° and receives a stop pin 171 that is fixed to the member 151. The outer end of the stop pin 171 is reduced, as at 172, and the reduced portion receives a cushioning sleeve 173 about which an eccentric sleeve or ring 175 is disposed. If desired, the eccentric ring 175 may be fixed, as by bonding, to the cushioning ring 173. The latter extends slightly outwardly of the reduced end 172, and by means of a washer 177 a clamping cap screw 178 fixes the cushioning ring 173 and the eccentric ring 175 to the stop pin 171 in different positions of adjustment. The member 152 and associated parts are shiftable between positions determined by the contact of the stop pin ring 175 with the ends of the slot 168. Turning the ring 175 into different positions, which may be done when the cap screw 178 is loosened, provides for adjusting the amount of cushioning secured. The sleeve 173 and associated parts are so proportioned and arranged that when the cap screw 178 is tightened the sleeve 173 is expanded radially an amount sufficient to grip the stop pin 171 so as to be held securely thereby in any selected position of adjustment.

One end of the slot 168 is defined by an end 181 of the stop lever 161. The latter may be disposed in any one of a number of different positions relatively to the arcuately slotted disk member 167 by adjusting means that provides both coarse and fine adjustments. Such adjustment means includes a substantially square block 184 movable radially in a slot 185 in the lever 161. The block 184 is recessed to receive an eccentric member 188 that bears indicia 189 cooperating with a pair of index marks 191 on the block 184. The eccentric member 188 carries a cap screw 193 having a threaded shank 194 adapted to be screwed into any one of a plurality of screw threaded openings 195 formed in the disk member 167. The curved member or portion 181 of the stop lever 161 carries an index mark 196 cooperating with a plurality of indicia 197 on the slotted disk member 167. A dowel sleeve 198 set in cooperating recesses 201 and 202 in the disk member 167 and the eccentric member 188 accurately holds the disk member 167 and the block 188 in connected relation in any position of adjustment of the latter. The member 188 is rotated by means of an integral hexagonal projection 203.

In operation, the disk member 167 and associated stop lever 161 are fixed to and form a part of the sleeve member 152, and the pin 171 is carried directly by the companion member 151. When it is desired to fix the parts in the proper position so as to secure the required amount of relative movement between the members 151 and 152, the cap screw 193 and dowel sleeve are inserted into the proper hole 195 in the disk member 167, and then the eccentric member 188 is rotated to secure a fine or accurate adjustment of the position of the stop lever 161 relative to the disk member 167. The cap screw 193 is then tightened to retain the adjustment made.

Whn the spring 164 is wound up and the table locked, the pin 171 lies at one end of the slot 168 as shown in Figure 7, and in this position the pin 171 engages a pin 205 that extends inwardly in a bore 206 formed in the member 167. The inner end of the pin 205 is tapered and engages the tapered end of a rod 207 supported for axial movement in the members 151 and 152 and which is adapted to actuate a switch, such as the switch unit 115 shown in Figure 1. The rod 207 is urged toward the left, as viewed in Figure 6, by a spring 208 acting between the member 154 and a set screw collar 209 on the rod 207.

The eccentric 175, rubber cushioned as at 173, serves to eliminate shock when the withdrawal of the table locking plunger 27 permits the spring 164 to release its stored energy and turn the table 13 to the extent permitted by the distance through which the stop lever 161 moves before the end 181 engages the sleeve 175. The desired or necessary amount of cushioning may be secured by turning the eccentric member 175 into the proper position and then tightening the cap screw 178.

When the indexing mechanism just described is used with a rotatable table or the like, such as the table 13, the indicia 189 and 197 may be in the form of graduations showing angular distances, but if the shiftable work support or table is a linearly movable member the indicia 189 and 197 may be in linear graduations. The adjustable stop mechanism described above and shown in Figures 6–8 when used with adjustable or interchangeable gearing provides substantially infinite adjustment or preselection of table or work support positions.

Figure 10:
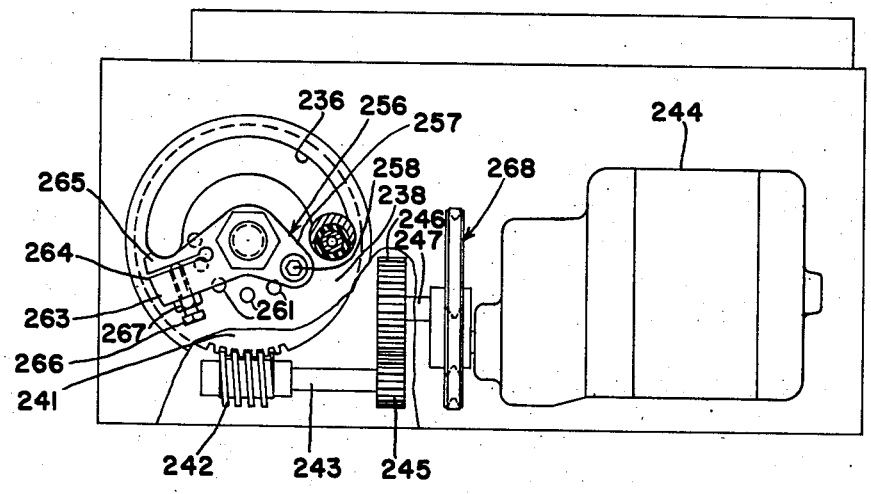
Figure 10 is a side view, taken generally along the line 10—10 of Figure 9.

Another form of this invention is illustrated in Figures 9–17. This form is particularly constructed to provide a wider range of possible table positions. Referring first to Figures 9–11, the casing or housing of this unit is indicated at 10a since in a few particulars is differs from the casing or housing 10 described above. The casing or housing 10a carries a spindle 212 on which a table or work support 213 is carried. The bottom of the casing supports a block 214 which at its upper end receives a cup 215 in which a thrust bearing 216 is disposed, the spindle 212 having a flange 217 which rests on the bearing 216. The lower end of the spindle is guidingly disposed in the lower part of the block 214 and fixed to a shoulder on the spindle is a worm gear 218. A shaft 221 is carried by the casing and a worm 222 that is fixed to the shaft 221 meshes with the worm gear 218, as best shown in Figure 9. A spring unit or stored energy unit 225, which is similar to the unit 150 described above, drives the shaft 221 through a pinion 226 fixed to the shaft 221 and a meshing spur gear 227 fixed to sleeve member 228 that forms the principal part of one of the two relatively rotatable parts 231 and 232 making up the unit 225. The other part 232 comprises a rotatable member 234 carrying a stop pin 235 movable in a slot 236 formed in a disk member 238 that is fixed, as by cap screws 239, to one end of the sleeve member 228. A worm gear 241 is fixed in any suitable way to the member 234 and meshes with a worm pinion 242 (Figure 10) that is fixed to a drive shaft 243. A motor or similar unit of relatively low power drives the shaft 243 through a pair of spur gears 245 and 246, a stub shaft 247, and belt and pulley means 248. The stop pin 235 carries an eccentric sleeve or cushioning unit 250 which may be substantially like the unit 173 described above.

A spring 255 or the like is connected at its opposite ends to the relatively rotatable members 231 and 232 and relative movement between said members 231 and 232 is limited by the stop pin 235 and an adjustable stop arm 256 having a first extension 257 apertured to receive a pin or cap screw 258 that is insertable into any selected one of a plurality of threaded openings 261 (Figure 10) formed in the disk member 238. The stop arm 256 has another extension 263 that is split, as at 264, to provide an adjustable section 265 the position of which, relative to the disk member 238, may be varied as desired by an adjusting screw 266 carrying a lock nut 267. The stop pin 235 operates a plunger or rod 271 the inner end of which is tapered, and the tapered end cooperates with a switch-operating rod 272 carried for axially directed movement in the sleeve member 228. The switch controlled by the rod 272 is indicated at 115b.

In this form of the invention the plunger that controls the starting and stopping of the table is indicated in its entirety by the reference number 280. Like the indexing plunger described above and shown in Figure 3, the plunger unit 280 includes an axially shiftable part movable into and out of indexing openings formed in the work supporting table, but in the form of invention now to be described, the plunger is also progressively shiftable about its axis into different positions so as to successively engage openings in different series, whereby a much greater number of table positions may be provided than would be possible using a single series of table openings as in Figure 1, for example.

As best shown in Figure 11, the table controlling plunger proper includes a pin 281 fixed in an eccentric position to a disk 282 that is secured to the upper end of a plunger stem 283. The lower end of the latter carries a piston 284 movable generally vertically in a cylinder 285 formed in the casing or housing 10a or a part carried thereby. An air inlet tube 286 directs air under pressure into the upper end of the cylinder 285 above the piston 284 therein. A spring 287 bears at its lower end against a portion of the housing, through which the lower part of the stem 283 extends, and at its upper end the spring 287 bears against a shoulder 288 formed on the stem 283. Above the shoulder the stem 283 is splined and passes through a bevel gear 292, the splined portion of the stem 283 being indicated at 291. A second bevel gear 293 meshes with the bevel gear 292 and, as best shown in Figure 9, the gear 293 is fixed to rotate with the shaft 221. A shoulder 295 on the stem 283 acts, like the shoulder 110 described above, to actuate a pin 296 that operates a switch 113a. By virtue of the gears 292 and 293, whenever the spring unit 225 is advanced the disk or head 282 is rotated through a part of a revolution about its vertical axis, being rotated through 60° in the form of indexing device shown in Figure 9.

In this form of the invention, the table 213 is provided with six series of plunger-receiving openings indicated by the reference numbers 301 through 306, respectively, and each series includes sixty holes, as illustrated, although it is to be understood that a smaller or a greater number of holes may be provided as desired. In the illustrated embodiment, where sixty holes are provided in each of the six series of openings and the plunger pin 281 is movable successively into six positions, the work supporting table will be advanced 1° at each operation of the spring unit 225. This action is illustrated in Figures 12 through 17.

Figure 12:
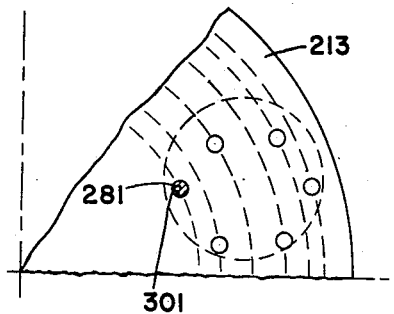
Figure 13:
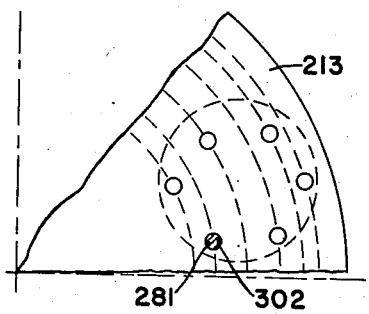
Figure 14:
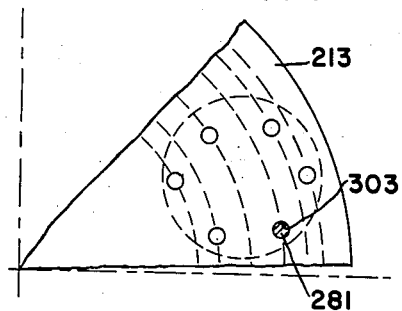
Figure 15:
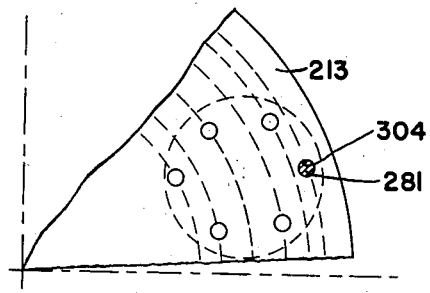
Figure 16:
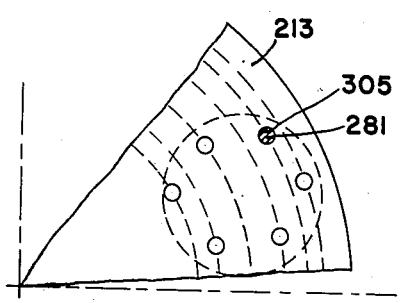
Figure 17:
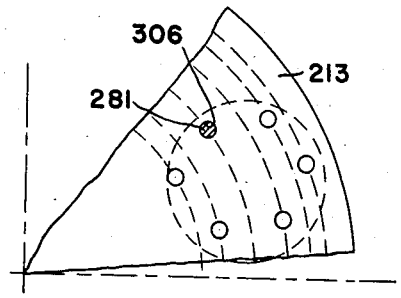

Referring now to these figures, which are partly diagrammatic, and assuming that the stop lever 256 is in a position of minimum table rotation with the pin 258 in the leftmost hole (Figure 10), it will be seen that the plunger pin 281 is shiftable into six different positions, illustrated respectively in Figures 12–17. In Figure 12 the pin 281 lies in one of the openings 301. When air under pressure is directed into the cylinder 285 the plunger is withdrawn from the table 213, whereupon the spring rotates the part 231 until the stop arm section 265 comes up against the stop pin 235. This movement acts through the gears 227 and 226 to rotate the shaft 221, the rotation of the latter acting through the worm gearing 218 and 222 to advance the table 213, and through the bevel gears 292 and 293 the shaft 221 serves to rotate the plunger stem 283 through 60°. This advances the plunger pin 281 from the position shown in Figure 12 to that shown in Figure 13, in which the pin 281 is in a position to engage an opening in the series 302. It will be understood that in this form of the invention the actuation of the switches 113a and 115b and the air controlling valve or valves is substantially the same as described above in connection with Figures 1 through 8, and therefore as soon as the air pressure is released the spring 287 acts to raise the plunger pin 281 up into the opening 302 (Figure 13), and this energizes the motor 244 which rewinds the spring 255. At the next actuation of the air valve the plunger pin 281 is withdrawn from the opening 302 and the table advances, rotating the plunger another 60° which then brings the pin 281 into a position to engage in one of the openings in the series 303. At the next advance of the table the plunger pin 281 is shifted into a position to engage one of the openings in the series 304, and similarly, succeeding advances of the table 213 bring the plunger pin 281 into positions engaging successively the openings 305 and 306, after which the cycle repeats. Thus, by virtue of successively shifting the table-locking plunger into different positions to engage successively in holes of different series, the work-supporting member, i. e., the table 213, is advanced in exceedingly small increments, 1° in the example shown and described.

By removing the pin 258, shifting the stop lever 256 to another position and replacing the pin in one of the other openings 261, the amount of the table advance at each operation of the stored energy unit may, for example, be doubled, tripled, etc., and if further variations are desired the gear ratios may be changed by using other gears or other pairs of gears, as desired, or by providing different tables with different numbers of holes therein. Because of the worming gearing, the starting and stopping of the table will be substantially shockless, and rebounding of the table, as with a relatively heavy work piece thereon, will be eliminated.

If desired, the form of the invention shown in Figures 9 through 17 may be modified further by eliminating the automatic advance of the plunger 280, effected through the bevel gear connection 292, 293, and providing means for manually advancing the pin 281 from one position to another. Thus, as shown in Figure 18, a table 213a may be provided with several different series of openings 305a, similar to the openings 301, etc., mentioned above, with means including a knob 310 on a shaft 311 carrying a bevel gear 293a meshing with a bevel gear 292a on the plunger stem 283, for changing the position of the plunger pin 281. Then, by turning the knob, the pin 281 may be arranged to engage in any selected series of table openings. The shaft 311 carries an indicator hand 312 for showing the position of the plunger pin 281.

As shown in both Figure 11 and in Figure 18, and also in Figure 9, the plunger disk 282 is fixedly held in each position by a holding or locating lug 313 carried by the casing or housing and having a tongue or extension 314 which accurately fits in any one of a number of notches 315 formed in the disk 282, one for each position or station of the plunger pin 281. The locating lug 313 is fixed to the casing by a pair of screws 316. The parts are so arranged that when the pin 281 is withdrawn from the associated table, the disk 282 is freed from the lug end 314 and can be rotated to a new position.

While I have described and shown the preferred structure in which the principles of the present invention have been incorporated, it is to be understood that my invention is not to be limited to the particular details shown and described above but that, in the practice of the broader aspects of my invention, widely different means may be utilized.

What I claim, therefore, and desire to secure by Letters Patents is:

1. An indexing device for shifting a work carrier successively through predetermined distances, comprising a device for storing energy, a motion transmitting connection from said device to said carrier, a plurality of stops on the carrier, a movable part shiftable into and out of engagement with said stops, and means responsive to a given displacement of said carrier and movement of said shiftable part into engagement with one of the stops on said carrier for storing energy in said device to replace that expended when said carrier is shifted.

2. An indexing device for shifting a work carrier successively through predetermined distances, comprising a device for storing energy including a pair of relatively movable parts, and a normally stressed resilient means interconnecting said parts, a motion transmitting connection between one of said parts and said carrier, releasable means for successively locking said carrier against movement and operative when released to permit a limited movement of said carrier by energy transmitted from said stressed resilient means through said motion transmitting connection to said carrier, stop means limiting the extent of movement between said relatively movable parts when said carrier is released, and means actuated by said stop means and connected with said other part for moving the latter to restress said resilient means.

3. An indexing device for shifting a work carrier successively through predetermined distances, comprising a device for storing energy including a pair of relatively movable parts, a spring connected at its ends with said parts, respectively, means for limiting the relative movement between said parts, means connecting one part with said carrier, rewind means connected with the other part, releasable locking means successively engageable with said carrier, release of said locking means permitting said carrier to be shifted by said spring acting through said one part and said connecting means, and means for actuating said rewind means in response to a carrier-shifting relative movement between said parts and a return of said locking means to its locking position.

4. An indexing device for shifting a work carrier through a number of preselected positions, comprising a releasable locking device for successively locking said carrier in said positions, a stored energy device comprising a pair of relatively movable parts, biased spring means connected to act between said parts for moving one of them through a distance corresponding to the distance between adjacent carrier positions, motion transmitting means connecting said one part with said carrier to shift the latter from one position to the next position, and means limiting the relative movement between said parts to that sufficient to shift said carrier from one position to the next position.

5. An indexing device as defined in claim 4, further characterized by said motion limiting means including adjustable parts providing for different amounts of movement imparted to said carrier.

6. An indexing device as defined in claim 4, further characterized by means for moving said locking device between carrier-locking and carrier-releasing position, movement of said locking device into its released position providing for movement of said carrier from one position to the next position by said spring means, and means responsive to return of said locking device to locking position to lock the carrier in its new position for shifting the other of said relative movable parts and thereby rewinding said spring means so as to restore thereto the energy expended by shifting said carrier from said one position to the next position.

7. An indexing device for shifting a work carrier successively through a plurality of spaced apart positions, comprising a pair of coaxially mounted parts, a spring member connected at its ends to said parts, respectively, a gear fixed to one of said parts, means connecting said gear with said work carrier whereby rotation of said one part serves to shift said carrier from one position to the next position, releasable locking means engageable with said carrier for holding the latter in any selected position, means connected with the other of said coaxially mounted parts and serving to prevent movement thereof in one direction, whereby said spring member is adapted to exert a force through said gear and associated connecting means for shifting said carrier, means for limiting the movement of said carrier, comprising a part fixed to one of said coaxially mounted parts and a cooperating abutment fixed to the other of said coaxially mounted parts, said abutment having two faces adapted to be contacted by said part, power means connected with said motion-preventing means for advancing said other of the coaxially mounted parts in the other direction, thereby imparting a bias to said spring member, and control means for said power means responsive to a shifting of the carrier and a movement of said locking means into locked position.

8. An indexing device as defined in claim 7, further characterized by said power means comprising an electric motor, said motion preventing means comprising in irreversible driving connection between said motor and said other of said coaxially mounted parts, and said control means including lock releasing means and a pair of serially connected switches responsive, respectively, to the position of said locking means and said abutment means relative to the associated part.

9. An indexing device for shifting a work carrier successively through a plurality of spaced apart positions, comprising a pair of coaxially mounted rotatable members, a spring connected at its ends with said members, respectively, a gear fixed to one of said members, means for driving said carrier from said gear, a locking plunger engageable with said carrier at any one of a plurality of points for releasably holding said carrier against movement, a part fixed to the other of said members, an abutment fixed to said one member, said abutment having separated faces disposed on opposite sides of said part and said faces being spaced apart a distance sufficient to provide a predetermined amount of rotation of said one member sufficient to advance said carrier from one position to the next position, said part lying against one face when said carrier is locked against movement and said spring is biased and conditioned to shift said carrier upon release of said plunger from the carrier, and lying against the other face when said plunger has been withdrawn and the carrier shifted to the next position by said spring, a motor having an irreversible connection with said other member and adapted when energized to shift said other member relative to said one member and rewind said spring until said part has been moved from a position against said other face to a position against said one face, and control means for said motor including means preventing energization thereof except when said plunger is in a carrier locking position and said part lies against said other face of said abutment.

10. In an indexing device, wherein a work carrier is adapted to be shifted successively into different positions, the improvement which comprises means forming a plurality of stops on said carrier in spaced apart relation, a movable locking member having a portion movable into and out of engagement with said stops successively to provide for controlled advance of said carrier for predetermined successive distances corresponding to the spacings between said stops, a pair of coaxially disposed members having axially spaced apart portions and each of said members being rotatable about their common axis, a spring in biased condition connected with said members, means for connecting one member with said carrier, whereby energy stored in said spring is available to react against the other member and rotate said one member and thereby shift said carrier, and means connected with said other member for successively rotating said other member so as to maintain said spring under said bias.

11. The improvement set forth in claim 10, further characterized by a pair of interengaging parts carried by said members, respectively, for limiting the extent of movement imparted to said one member by action of said spring at any one time.

12. The improvement set forth in claim 11, further characterized by means operative in response to movement of said parts into a predetermined position for automatically advancing said other member.

13. In an indexing device the combination of a work carrier adapted to be shifted from one position to another, a plurality of stops carried in spaced apart relation on said carrier, a lock plunger movable into and out of a position abutting one of said stops to hold the carrier against movement in one direction, means including a cylinder and piston device for shifting said plunger, a pair of relatively shiftable members, one being adapted to be connected with said carrier to shift the latter, a spring in biased condition connected with said members and adapted to react against the other of said members for shifting said one member, utilizing energy stored in said spring, said lock plunger when in engagement with one of said stops serving to limit the amount of movement imparted to said one member by said spring relative to said other member, and means for shifting said other member in the same direction as said spring moves said one member, for rewinding said spring.

14. In an indexing device wherein a work carrier is adapted to be shifted from one position to another, a pair of relatively rotatable members, one adapted to be connected with said work carrier, a stop arm fixed to one of said members, and a stop member carried by the other of said relatively rotatable members and disposed on said other member in a position to be engaged by said stop arm.

15. The invention set forth in claim 14, further characterized by means acting against a portion of said stop arm to provide a fine adjustment for the engagement of said stop member therewith.

16. In an indexing device, a work carrier means for successively advancing said carrier, the latter having a plurality of spaced apart series of plunger-receiving openings in relatively closely spaced relation, a reciprocable carrier-locking plunger movable toward and away from said carrier, and means for shifting said plunger successively from a position engageable with one series of openings to another position engageable with another series of openings.

17. The invention as defined in claim 16, further characterized by said plunger shifting means including a part driven from said carrier advancing means.

18. The invention as defined in claim 16, further characterized by said plunger including a carrier-engaging pin disposed eccentrically with respect to the axis of said plunger, said plunger being reciprocable along said axis toward and away from said carrier, and gearing driven from said carrier advancing means for rotating said plunger about said axis so as to position said carrier-engaging pin for engagement in different series of said openings.

19. An indexing device for shifting a work carrier successively through predetermined distances, comprising a device for storing energy, including a pair of relatively movable parts, a spring connecting said parts, a first stop means acting in one direction to limit the amount of relative movement between said parts under the action of said spring, means connecting one of said parts with said carrier, rewind means connected with the other part, a second stop means limiting the amount of relative movement between said parts in the other direction, and said first stop means being adjustable, whereby the extent of movement imparted to said carrier may be adjusted, said second stop means being non-adjustable whereby said spring is rewound to substantially the same degree irrespective of the amount of movement imparted to the carrier.

20. A power device for shifting a member through a plurality of spaced apart positions, said device comprising a pair of relatively movable parts, a spring member connected at its ends to said parts, respectively, a gear fixed to one of said parts, means connecting said gear with said shiftable member, releasable locking means engageable with said shiftable member for holding the latter in selected position, means connected with the other of said relatively movable parts and serving to prevent movement thereof in one direction, whereby said spring member is adapted to exert a force through said gear and associated connecting means for moving said shiftable member, power means connected with said motion preventing means and acting through the latter to advance said other part in one direction, and means connected with said locking means and actuated thereby for controlling said power means.

21. Mechanism for shifting a member successively into different positions, comprising a pair of relatively movable parts, a spring connected at its ends with said parts, respectively, means for limiting the amount of permissive movement between said parts, means connecting one of said parts with said member, rewind means connected with the other part, releasable locking means operatively connected with said member for holding the latter in its successive positions, and means for actuating said rewind means and connected with said locking means and said motion limiting means so as to operate said rewind means in response to a member-shifting movement between said parts and a return of said locking means to its locking position.

22. In a device for successively shifting a member into different positions, a pair of relatively movable parts, means adapted to receive, store and release energy connected between said parts, one of said parts being adapted to be connected with said member, a worm gear connected with the other part, means including a worm meshing in irreversible relation with said gear for driving the latter, stop means acting between said parts for limiting relative movement therebetween, motion arresting means movable into member-locking and member-releasing positions with respect to said member, and controlled, at least partially, by said motion-arresting means for rotating said worm.

23. An indexing device for shifting a work carrier successively through a plurality of spaced apart positions, comprising a pair of coaxially mounted parts, a spring member connected at its ends to said parts, respectively, means connecting one of said parts with said work carrier, whereby actuation of said one part serves to shift said carrier from one position to the next position, releasable locking means engageable with said carrier for holding the latter in any selected position, means connected with the other of said coaxially mounted parts and serving to prevent movement thereof in one direction, whereby said spring member is adapted to exert a force through said associated connecting means for shifting said carrier, means for limiting the movement of said carrier, power means connected with said movement-preventing means for advancing said other of the coaxially mounted parts in the other direction, thereby imparting a bias to said spring member, and control means for said power means responsive to a shifting of the carrier and a movement of said locking means into locked position.

24. An indexing device for shifting a work carrier successively through predetermined distances, comprising a device for storing energy, a motion transmitting connection from said device to said carrier, means connected with said device for maintaining a substantially constant torque therein, said carrier having a plurality of stops, a shiftable part engageable in one position with one of said stops to hold the carrier against movement, means to shift said part into another position to release said carrier for movement, and stop means acting against said carrier for limiting movement thereof after a given displacement, said stop means including cushioning means to absorb the impact of stopping movement of said carrier.

25. In an indexing device, a movable work carrier, resilient means normally under a bias and connected with said carrier for shifting the latter in one direction, means including a pair of spaced apart stops connected with said carrier for determining the amount of movement that can be imparted to said carrier at any one one time, and means for changing said limits.

26. In an indexing device as defined in claim 25, the further provision of means associated with at least one of said stops for cushioning said carrier when said one stop terminates movement of the carrier.

27. In an indexing device or the like, a work carrier driving means comprising a pair of coaxial members, one mounted for rotation relative to the other, and both mounted for rotation about their common axis, a biasing spring connected at its opposite ends to said members, respectively, axially disposed means connected with one of said members and extending to a point adjacent the other member, and stop means carried by said other member and said axially disposed means for limiting the extent of rotation of one of said members relative to the other.

28. The invention set forth in claim 27, further characterized by said first mentioned other member having an opening, said axially disposed means extending through said opening, and said stop means being connected with the outer end of said axially disposed means and the outer side of said other member.

29. The invention set forth in claim 27, further characterized by said stop means including cushioning means to absorb the impact of stopping said carrier.

30. The invention set forth in claim 27, further characterized by said stop means including a part on one member, and a pair of spaced apart parts on the other member, one of said spaced apart parts being adjustable and said first stop part being disposed between said spaced apart parts.

31. The invention set forth in claim 30, further characterized by a cushioning member carried by said first stop part and engageable with one of said spaced apart parts.

32. The invention set forth in claim 30, further characterized by one of said spaced apart parts having means provided with a plurality of spaced apart holes, and said other of said spaced apart parts being insertable in any one of said holes.

33. The invention set forth in claim 32, further characterized by an auxiliary means with said last mentioned other part and providing a fine adjustment between the positions represented by two adjacent holes.

34. In an indexing device, a work carrier, means to successively advance said carrier, the latter having a plurality of spaced apart series of openings in spaced apart relation, a reciprocable carrier locking member movable into and out of engagement with the carrier openings, and means connected to act concomitantly with said carrier for shifting said member from a position engageable with one series of openings to another position engageable with another series of openings.

35. An indexing device for shifting a work carrier or the like successively through predetermined distances, comprising a device capable of receiving, storing and expending energy, said device including an anchored portion and a movable portion, motion transmitting means connecting said movable portion with said carrier for moving the latter, releasable means for locking said carrier against movement, means connected to hold said movable portion against movement relative to said anchored portion so as to limit the amount of movement that can be imparted to said carrier from said device when said releasable means is released, and means responsive to movement of said movable portion into its motion-limited position and to return of said releasable means into a carrier-locking position for storing energy in said device to replace that expended by said device in shifting said carrier.

36. An indexing device comprising a work carrier, a device for storing energy, a motion-transmitting connection from said device to said carrier, means connected with said device to control the energy output of said device and adapted in one position to prevent the transmission of energy to said carrier, releasable means operable on the carrier to lock the latter against movement, and means responsive to the position of said releasable means and said control means to direct restoring energy to said device when said releasable means is in a carrier locking position and said control means is in its said one position in which no energy is transmitted to said carrier.

37. An indexing device for shifting a work carrier successively through predetermined distances, comprising a device for storing energy, a motion transmitting connection from said device to said carrier, a source of power, means connected with said carrier and movable into a given position in response to a predetermined amount of movement of said carrier toward a new position, and means actuated by said last mentioned means for restoring energy to said device.

38. For use with a part to be driven, the combination of a pair of relatively movable members, means connecting one of said members with said part, resilient means connected with said members to act therebetween in stressed relation, stop means acting between said members to limit the amount of permissive movement of one member relative to the other, a source of power connected with the other member to restress said resilient means, and means responsive to a given amount of movement of said members one relative to the other, to cause said source of power to shift said other member and restress said resilient means.

39. For use with a part to be driven, the combination of a pair of relatively movable members, means for connecting one of said members with said part, resilient means connected in stressed relation between said members, a source of power for moving said other member to restress said resilient means, means for controlling said source of power, a pair of parts movable proportionally to said members, respectively, whereby said parts move into a given predetermined relative position when said resilient means acts to drive said driven part, and means connecting said pair of parts with said controlling means.

40. An indexing device for shifting a work carrier successively through predetermined distances, comprising a device for storing energy, a motion transmitting connection from said device to said carrier, a plurality of stops connected to move with said carrier, a movable part shiftable into and out of engagement with said stops, and means responsive to a given displacement of said carrier and movement of said shiftable part into engagement with one of said stops for storing energy in said device.

41. In a device for successively shifting a member into different positions, a pair of relatively movable parts, means adapted to receive, store and release energy connected between said parts, one of said parts being adapted to be connected with said member, energy restoring means connected with the other part, a pair of stop parts connected, respectively, to move with said movable parts and acting in one relative position to limit relative movement between said movable parts, motion arresting means movable into member-locking and member-releasing positions with respect to said shiftable member, and means controlled, at least partially, by said motion-arresting means and by said pair of stop parts for actuating said energy restoring means.

42. In an indexing device, a support, a work carrier movably supported thereby, means connected to rotate when said carrier is moved, said means including an axially shiftable part having a carrier locking means and a plurality of openings, means on said support to engage said openings successively when said shiftable means is shiftable axially into carrier locking position, and means for shifting said shiftable part axially.

43. In an indexing device, a support, a work carrier movably supported thereby, means connected to rotate when said carrier is moved, said means including a plurality of sets of openings, an axially movable part having carrier locking means adapted to enter an opening in one of said sets and said movable part also including a plurality of means adapted to engage a part of said support to lock said part against rotary movement when said carrier locking means engages one of said openings, and means to rotate said part when the latter is shifted into a carrier-releasing position and the released carrier is advanced.

44. In an indexing device or the like, a work carrier driving means comprising a pair of coaxial members, one mounted for rotation relative to the other, and both mounted for rotation about their common axis, resilient biasing means connected to act between said members, a pair of stop parts mounted in cooperative adjacency and connected to move with said coaxial members, respectively, the spacing between said stop parts determining the extent of permissive movement of one member with respect to the other, means connecting one of said members to a work carrier, and means connected with the other member to rebias said resilient means.

45. In an indexing device or the like, a support, a work carrier movably supported thereby, a work carrier driving means comprising a pair of coaxial members, one mounted for rotation relative to the other and one having a part extending generally axially through the other, a biasing spring connected at its ends to said members, respectively, means connecting said carrier with one of said members to be driven thereby and stop means connected with said one member to control the advance imparted to said carrier by said spring, and rewind means connected with the member other than the one to which said stop means is connected for maintaining a bias in said spring.

46. In an indexing device or the like, a support, a work carrier movably supported thereby, a work carrier driving means comprising a pair of coaxial members, one mounted for rotation relative to the other and one having a part extending generally axially through the other, a biasing spring connected at its ends with said members, respectively, said carrier being connected with the member having the extending part, stop means connected with said extending part for controlling the advance imparted to said carrier by said spring, and rewind means connected with the other member.

47. In an indexing device, wherein a work carrier is adapted to be shifted successively into different positions, the improvement that comprises means forming a plurality of stops movable with the carrier, an associated locking member operatively engageable with said stops successively so as to provide for controlled advance of said carrier for predetermined successive distances corresponding to the spacings between said stops, a pair of coaxially disposed members having axially spaced apart portions and each of said members being rotatable about their common axis, a spring in biased condition connected with said members, means for connecting one member with said carrier, whereby energy stored in said spring is available to react against the other member and rotate said one member and thereby shift said carrier, and means connected with the other member for successively rotating said other member so as to maintain said spring under said bias.

References Cited in the file of this patent

UNITED STATES PATENTS

| | | |
|---|---|---|
| 686,266 | DeLeeuw | Nov. 12, 1901 |
| 1,067,682 | Rossler | July 15, 1913 |
| 1,158,991 | Dixon et al. | Nov. 2, 1915 |
| 1,206,006 | Lifflander | Nov. 28, 1916 |
| 1,395,802 | Dickinson et al. | Nov. 1, 1921 |
| 1,399,790 | Phillips | Dec. 13, 1921 |
| 1,436,687 | Scotford | Nov. 28, 1922 |
| 1,794,881 | Connell | Mar. 3, 1931 |
| 1,840,300 | Archea | Jan. 12, 1932 |
| 2,007,827 | Fletcher | July 9, 1935 |
| 2,318,453 | Barnard | May 4, 1943 |
| 2,610,551 | Reidel | Sept. 16, 1952 |

FOREIGN PATENTS

| | | |
|---|---|---|
| 597,772 | Germany | May 4, 1932 |